United States Patent
Schumacher

(10) Patent No.: US 7,333,663 B1
(45) Date of Patent: Feb. 19, 2008

(54) METHOD AND APPARATUS FOR EFFICIENT ENTROPY CODING OF IMAGES

(75) Inventor: Paul R. Schumacher, Rochester, MN (US)

(73) Assignee: Xilinx, Inc., San Jose, CA (US)

( * ) Notice: Subject to any disclaimer, the term of this patent is extended or adjusted under 35 U.S.C. 154(b) by 836 days.

(21) Appl. No.: 10/408,919

(22) Filed: Apr. 7, 2003

(51) Int. Cl.
G06K 9/36 (2006.01)
G06K 9/46 (2006.01)

(52) U.S. Cl. ............... 382/240; 382/234; 382/246; 382/248

(58) Field of Classification Search ............... 382/240
See application file for complete search history.

(56) References Cited

U.S. PATENT DOCUMENTS

| | | | |
|---|---|---|---|
| 6,501,397 B1* | 12/2002 | Radha et al. | 341/60 |
| 6,549,666 B1* | 4/2003 | Schwartz | 382/233 |
| 6,606,416 B1* | 8/2003 | Yip et al. | 382/240 |
| 6,658,159 B1* | 12/2003 | Taubman | 382/240 |
| 6,792,150 B1* | 9/2004 | Satoh | 382/238 |
| 7,133,567 B2* | 11/2006 | Ohyama et al. | 382/246 |
| 2003/0035476 A1* | 2/2003 | Ohyama et al. | 375/240.1 |

OTHER PUBLICATIONS ("The JPEG2000 Still Image Coding System: An Overview", Christopoulos, C.; Skodras, A.; Ebrahimi, T.; Consumer Electronics, IEEE Transactions on vol. 46, Issue 4, Nov. 2000 pp. 1103-1127.*
David Taubman et al.; "Embedded Block Coding in JPEG2000"; IEEE International Conference on Image Processing (ICIP); Sep. 2000; vol. 2; pp. 33-36.
Jen-Shiun Chiang et al.; "Efficient Pass-Parallel Architecture for EBCOT in JPEG2000"; IEEE ISCAS 2002; May 2002; vol. 1, pp. 773-776.

* cited by examiner

Primary Examiner—Wenpeng Chen
Assistant Examiner—Yuzhen Ge
(74) Attorney, Agent, or Firm—W. Eric Webostad

(57) ABSTRACT

Method and apparatus for encoding image data is described. In an example, a memory stores bit-planes associated with the image data. Each of the bit-planes is partitioned into data units. A bit modeler communicates with the memory and produces modeled data in response to each of the data units for each of the bit-planes. An arithmetic coder communicates with the bit modeler and produces a coded data in response to each of the modeled data produced by the bit-modeler. In another example, the bit-modeler processes at least two of the bit-planes in parallel.

8 Claims, 9 Drawing Sheets

METHOD AND APPARATUS FOR EFFICIENT ENTROPY CODING OF IMAGES

FIELD OF THE INVENTION

One or more aspects of the invention relate generally to encoding images and, more particularly, to entropy encoding of images.

BACKGROUND OF THE INVENTION

In January 2001, the Joint Photographic Experts Group (JPEG) committee approved a new digital still image standard known as JPEG2000. The JPEG2000 standard adds a number of new features that were not present in the existing JPEG standard, including better low bit-rate performance, both loss and lossless encoding in a single algorithm, precise single-pass rate control, embedded codestreams, and improved error resiliency. There are numerous applications for the JPEG2000 image encoding process, such as digital cameras, personal digital assistants (PDAs), transmission of images through the Internet, military surveillance systems, medical imaging systems, and the storage of motion sequences (e.g., digital cinema).

While the JPEG2000 standard specifies bitstream and file formats to ensure interoperability, the JPEG2000 standard leaves open the actual implementation of the image encoder. The major drawback of conventional JPEG2000 image encoders involves the implementation of bit/context modeling and arithmetic coding (entropy coding), which is referred to as "tier-1 coding". Notably, the tier-1 coding process involves separating two-dimensional discrete wavelet transform (DWT) samples of an image into code blocks, modeling the bit-planes of the DWT coefficients within each code block independently, and performing arithmetic coding on the modeled bitstream. The bit-modeling process includes three coding passes for each bit-plane, with the exception of the most significant bit-plane, which requires only a single pass.

In conventional tier-1 coders, a bit modeler performs the three coding passes in succession on each bit-plane. In addition, the bit-modeler processes the code blocks one bit-plane at a time. Performing the three coding passes in succession results in approximately 14% of the clock cycles being stall states for the arithmetic coder. As such, the arithmetic coder becomes the "bottleneck" of the tier-1 coding process. In high bit-rate applications (e.g., real-time video processing) and low-power applications (e.g., wireless communication and handheld devices), the tier-1 coding process is computationally intensive and requires a significant amount of resources. As such, a bottleneck at the arithmetic coder is undesirable.

Therefore, there exists a need in the art for an efficient entropy coder that facilitates high bit-rate, low-power operation within an image encoder.

SUMMARY OF THE INVENTION

Method and apparatus for encoding image data is described. In an embodiment, a memory stores bit-planes associated with the image data. Each of the bit-planes is partitioned into data units. A bit modeler communicates with the memory and produces modeled data in response to each of the data units for each of the bit-planes. An arithmetic coder communicates with the bit modeler and produces coded data in response to each of the modeled data produced by the bit-modeler. In another embodiment, the bit-modeler processes at least part of at least two of the bit-planes in parallel.

BRIEF DESCRIPTION OF THE DRAWINGS

Accompanying drawing(s) show exemplary embodiment (s) in accordance with one or more aspects of the invention; however, the accompanying drawing(s) should not be taken to limit the invention to the embodiment(s) shown, but are for explanation and understanding only.

DETAILED DESCRIPTION OF THE DRAWINGS

Method and apparatus for efficient entropy coding of images is described. One or more aspects of the invention relate to tier-1 coding of images within a JPEG2000 image encoder. Although embodiments of the invention are described within the context of tier-1 coding in a JPEG2000 image encoder, those skilled in the art will appreciate that the invention may be used in other types of image encoders that employs entropy coding of images.

Figure 1:
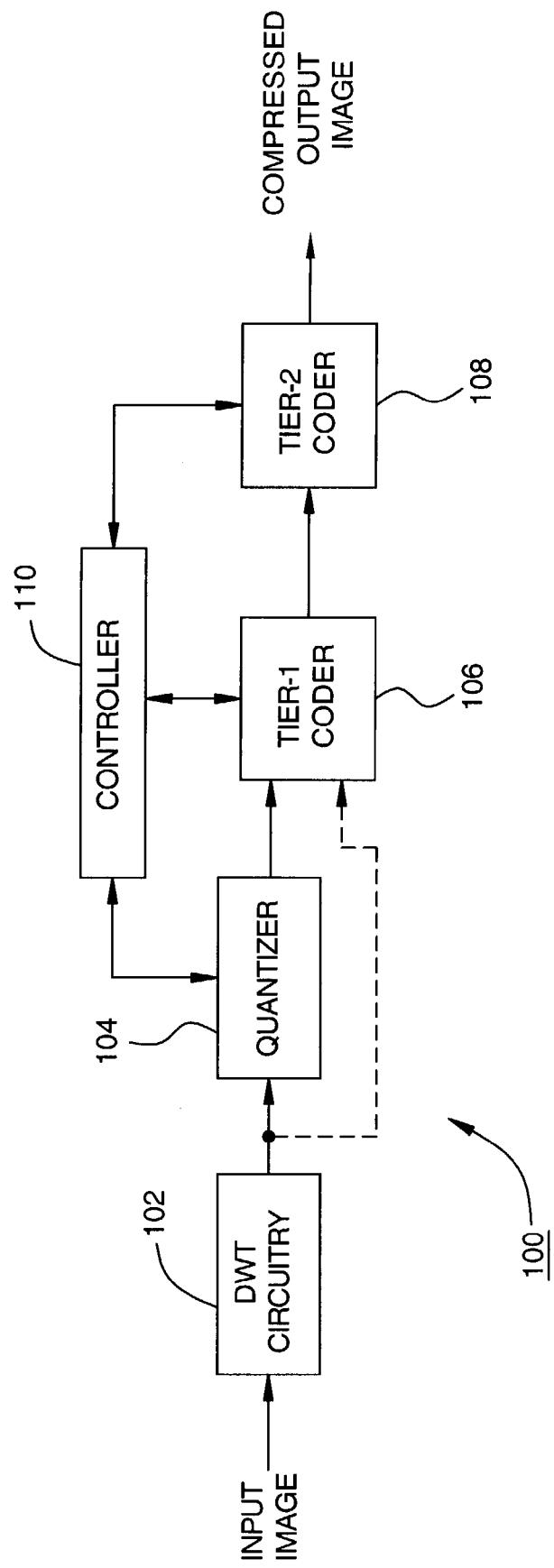
FIG. 1 depicts a block diagram showing an illustrative image encoder that employs an entropy coder in accordance with one or more aspects of the invention.

FIG. 1 depicts a block diagram showing an illustrative image encoder 100 that employs an entropy coder in accordance with one or more aspects of the invention. For purposes of clarity by example, image encoder 100 is described as a JPEG2000 image encoder. Image encoder 100 includes discrete wavelet transform (DWT) circuitry 102, a quantizer 104, an entropy coder ("tier-1 coder" 106), a tier-2 coder 108, and a controller 110. Image encoder 100 processes an input image to produce a compressed output image. An input of DWT circuitry 102 receives the input image. DWT circuitry 102 translates the input image into the frequency domain in a well-known manner.

Figure 2:
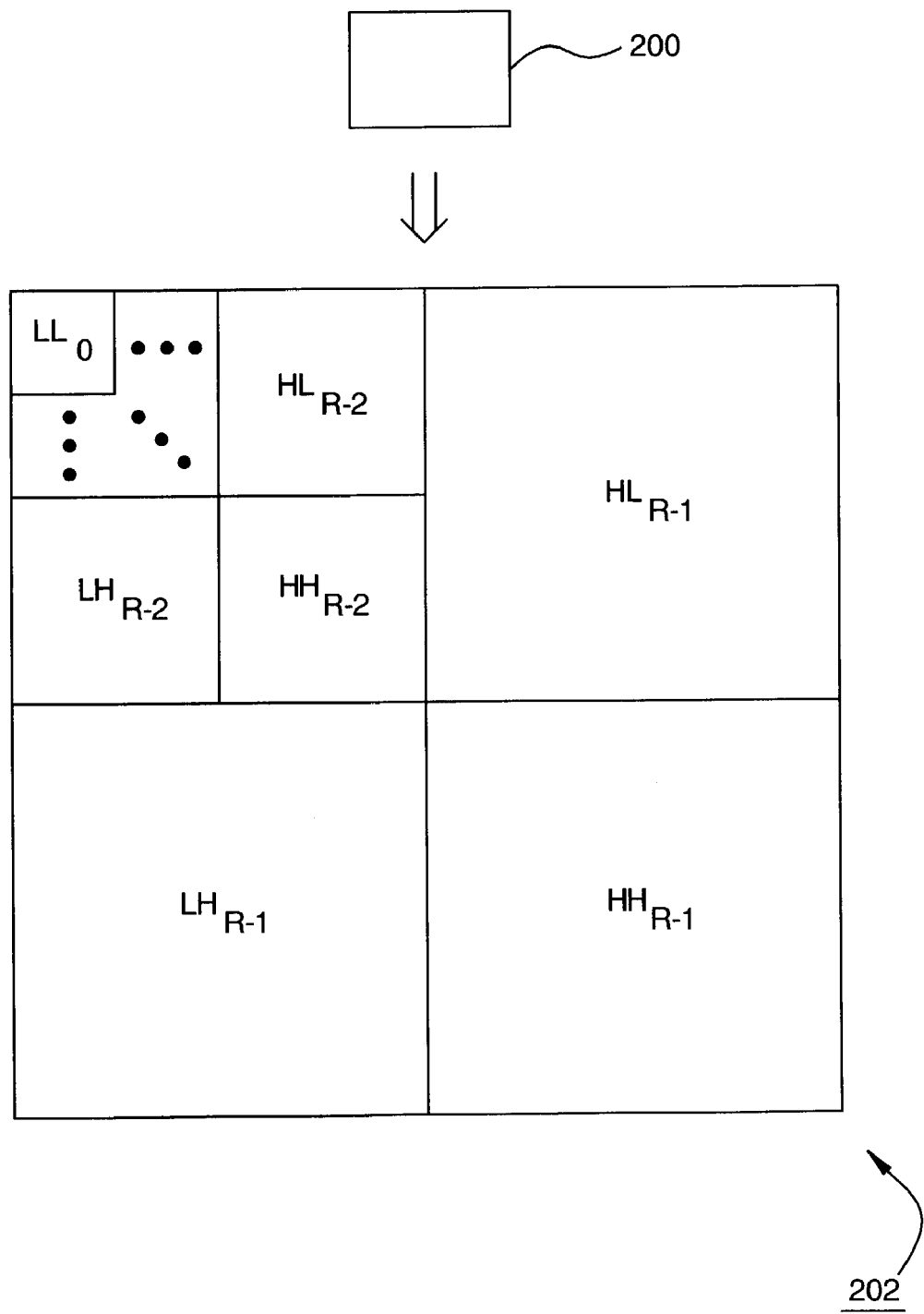
FIG. 2 depicts a diagram showing an exemplary DWT process for translating an image into the frequency domain in accordance with one or more aspects of the invention.

FIG. 2 depicts a diagram showing an exemplary DWT process for translating an image 200 into the frequency domain in accordance with one or more aspects of the invention. Image 200 is decomposed into four subbands, namely, a horizontally and vertically lowpass (LL) band, a horizontally lowpass and vertically highpass (LH) band, a horizontally highpass and vertically lowpass (HL) band, and a horizontally and vertically highpass (HH) band. The input image may be decomposed into the four subbands over R resolution levels numbered from 0 to R−1, where R is an integer greater than zero. At each resolution level (except the lowest resolution level), the LL band is further decomposed into the four subbands. For example, the $LL_{R-1}$ band is decomposed into the $LL_{R-2}$, $LH_{R-2}$, $HL_{R-2}$, and $HH_{R-2}$ bands. The decomposition process repeats until the $LL_0$ band is obtained. In this manner image 200 is translated into the frequency domain to produce a frequency domain image 202.

Returning to FIG. 1, an output of DWT circuitry 102 provides frequency domain samples ("DWT coefficients") of the input image. If lossless encoding is desired, the DWT coefficients are coupled to an input of tier-1 coder 106. If lossy encoding is desired using the 9/7 DWT filter, then the DWT coefficients are coupled to an input of quantizer 104. Quantizer 104 quantizes the frequency domain samples in a well-known manner. An output of quantizer 104 provides quantized DWT coefficients to tier-1 coder 106. For purposes of clarity, tier-1 coder 106 will be described as processing DWT coefficients. It is to be understood, however, that the DWT coefficients may be quantized by quantizer 104 before being coupled to tier-1 coder 106.

Figure 3:
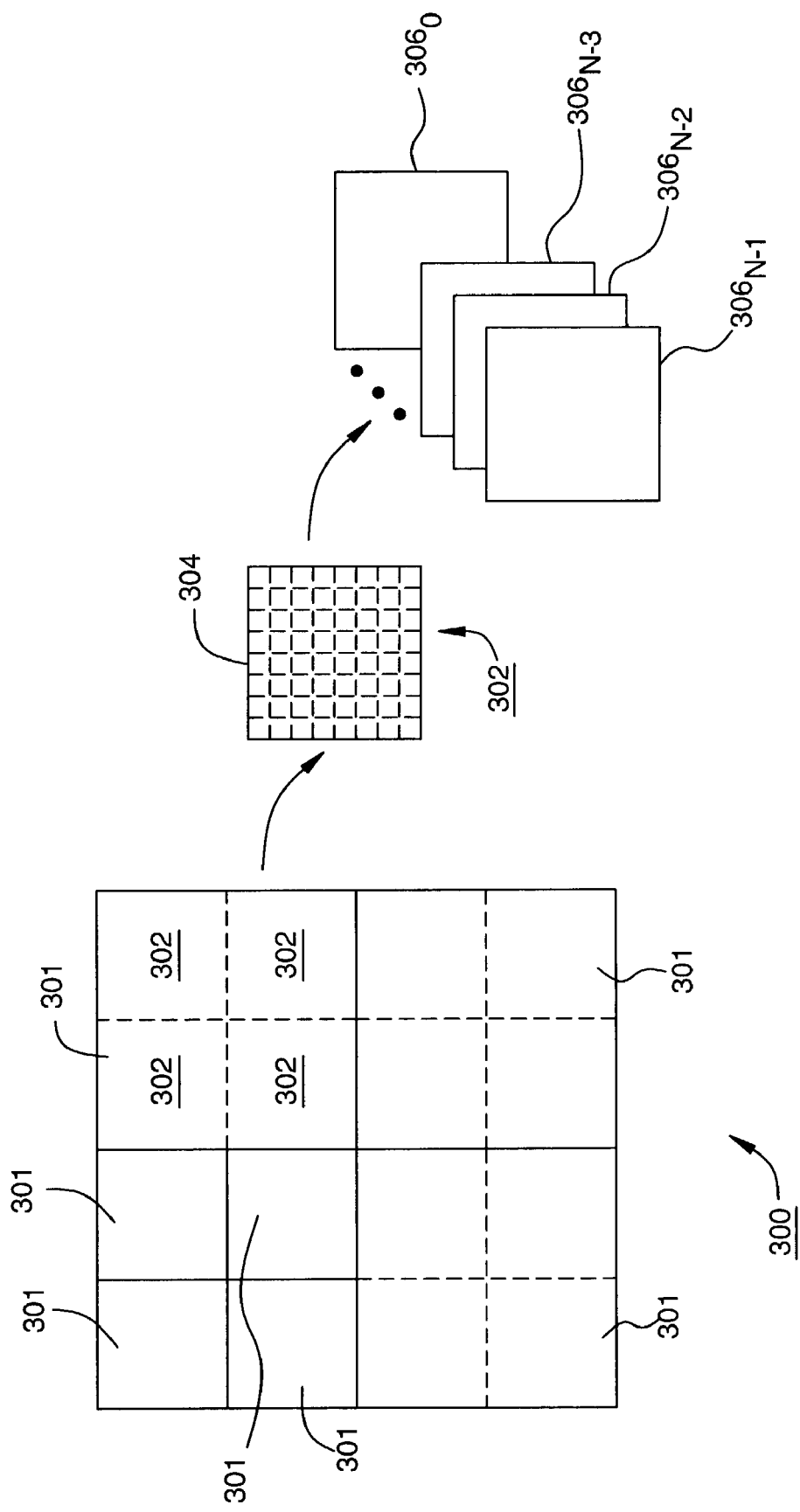
FIG. 3 depicts a diagram showing an exemplary process for grouping a frequency domain image into code-blocks in accordance with one or more aspects of the invention.

At the input of tier-1 coder 106, the DWT coefficients are grouped into code-blocks. FIG. 3 depicts a diagram showing an exemplary process for grouping a frequency domain image 300 into code-blocks in accordance with one or more aspects of the invention. Each of subband 301 of frequency domain image 300 is partitioned into code-blocks 302. Each of code-blocks 302 is a rectangular array of DWT coefficients 304. For example, each of code-blocks 302 may include a 64×64 array of DWT coefficients. The JPEG2000 standard specifies that the nominal width and height of a code-block must be an integer power of two, and the product of the nominal width and height cannot exceed 4096. Each of code-blocks 302 includes N bit-planes $306_0$ through $306_{N-1}$ (collectively referred to as bit-planes 306). As understood by those skilled in the art, the number of bit-planes, N, corresponds to the number of bits within a DWT coefficient.

Returning to FIG. 1, tier-1 coder 106 independently codes each code-block of DWT coefficients. An output of tier-1 coder 106 provides an entropy-coded bytestream. An input of tier-2 coder 108 receives the entropy-coded bytestream. Tier-2 coder 108 "compiles" the entropy-coded bytestream into packets in a well-known manner. An output of tier-2 coder 108 provides the compressed output image. The rate at which quantizer 104, tier-1 coder 106, and tier-2 coder 108 processes the input image is controlled by controller 110 in a well-known manner.

Figure 4:
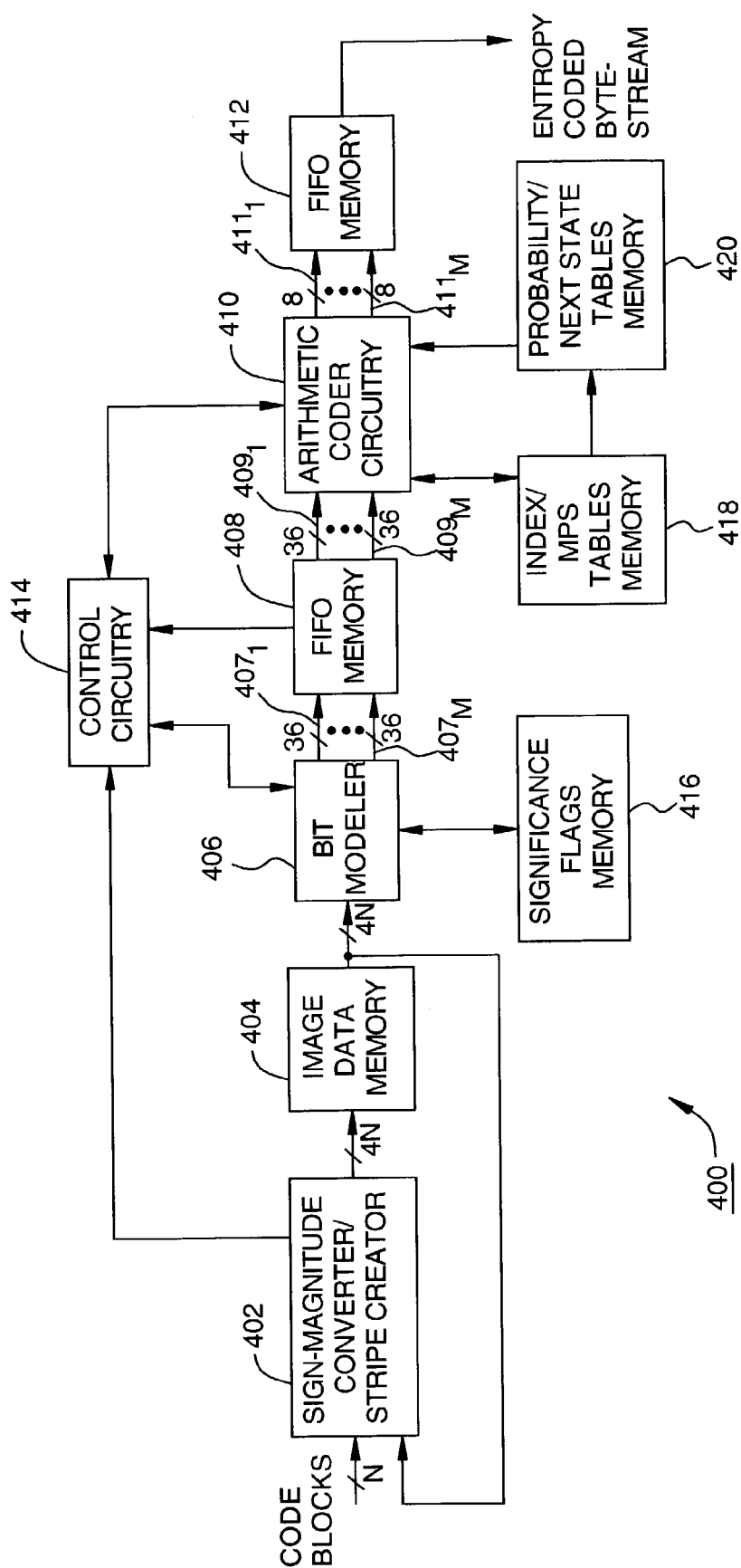
FIG. 4 depicts a block diagram showing an exemplary embodiment of an entropy coder in accordance with one or more aspects of the invention.

FIG. 4 depicts a block diagram showing an exemplary embodiment of an entropy coder 400 in accordance with one or more aspects of the invention. Entropy coder 400 may be used as tier-1 coder 106 of image encoder 100 shown in FIG. 1 and described above. Entropy coder 400 includes a sign-magnitude converter/stripe creator 402, a first memory ("image data memory" 404), a bit modeler 406, a second memory ("first in, first out (FIFO) memory" 408), arithmetic coder circuitry 410, a third memory ("FIFO memory" 412), and control circuitry 414. An input of entropy coder 400 receives code-blocks of DWT coefficients from a buffer (not shown). Entropy coder 400 successively processes the code-blocks to produce a coded bytestream.

In an embodiment, a code-block includes up to 4096 DWT coefficients (e.g., an array of 64×64 coefficients), where each DWT coefficient includes N bits of data ("DWT coefficient word"), where N is greater than 1. For example, a DWT coefficient word may include 12 bits, namely, 8 bits of image data and 4 bits of growth in the component transformation and the DWT. An input of sign-magnitude converter/stripe creator 402 is configured to receive a DWT coefficient word. Those skilled in the art will appreciate that the sign-magnitude converter/stripe creator 402 may be configured to receive DWT coefficient words of other sizes, such as DWT coefficient words having 16 bits. In addition, entropy coder 400 may process code-blocks of other sizes, such as code-blocks having 1024 DWT coefficients (e.g., an array of 32×32 coefficients).

Sign-magnitude converter/stripe creator 402 converts each DWT coefficient word into sign-magnitude format. As described above, a code-block of DWT coefficients includes a plurality of bit-planes. After conversion into sign-magnitude format, the DWT coefficients form a sign bit-plane, and a plurality of magnitude bit-planes. For example, if the DWT coefficient words have 12 bits, then there is a sign bit-plane and 11 magnitude bit-planes.

Figure 5:
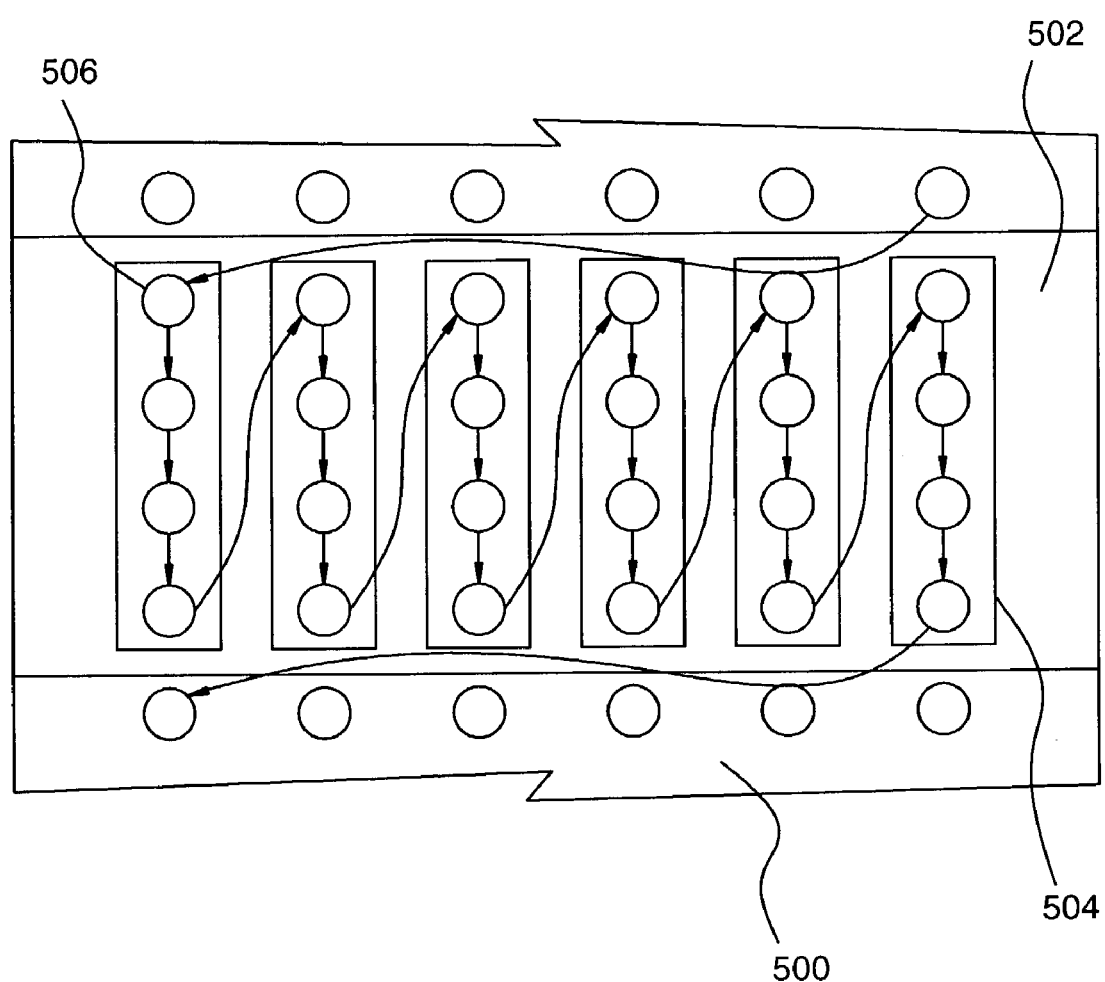
FIG. 5 depicts a diagram showing a portion of a bit-plane in accordance with one or more aspects of the invention.

In addition to converting DWT coefficient words into sign-magnitude format, the sign-magnitude converter/stripe creator 402 organizes the bit-planes formed by the DWT coefficient words into predefined data units ("stripes"). FIG. 5 depicts a diagram showing a portion 500 of a bit-plane in accordance with one or more aspects of the invention. Portion 500 includes a horizontal row 502. Horizontal row 502 is organized into a plurality of stripes 504 of bits 506 (six stripes are shown). Each of the stripes 504 includes four bits 506.

Returning to FIG. 4, an output of sign-magnitude converter/stripe creator 402 provides each stripe produced to image data memory 404, which may be random access memory (RAM). As described above, each stripe includes 4 data bits. In an embodiment where the DWT coefficients have 12 bits, the output of the sign-magnitude converter/ stripe creator 402 provides 48-bit words to image data memory 404, where each 48-bit word holds one 4-bit stripe per bit-plane. The 48-bit word stored in image data memory 404 includes new data from sign-magnitude converter/stripe creator 402 as well as previously stored data from image data memory 404 to create the stripes. In general, sign-magnitude/stripe creator 402 provides 4N-bit words to image data memory 404.

As described in more detail below, bit modeler 406 processes a plurality of bit-planes in parallel. For each bit-plane processed, the respective stripes are processed in a specific scan order, which is shown in FIG. 5. Horizontal rows within a given bit-plane are scanned from top to bottom. Within a row, stripes are scanned from left to right. Within a stripe, bits are scanned from top to bottom. To facilitate processing within bit-modeler 406, image data memory 404 stores each bit-plane of the image data in stripe format. As described below, bit modeler 406 processes an entire column of bits within a stripe for a given bit-plane simultaneously. By storing each bit-plane in stripe format, an embodiment of the invention facilitates access of stripe data by bit modeler 406. Notably, bit modeler 406 may obtain stripes of a bit-plane directly from image data memory 404 without having to organize the stripes from unorganized DWT coefficient data.

An output of image data memory 404 is configured to provide a word having a stripe for each bit-plane. In an embodiment where a stripe includes 4 data bits and there are 12 bit-planes, the output of image data memory 404 is configured to provide a 48-bit word having one stripe per bit-plane. In general, the output of image data memory 404 is configured to provide a 4N-bit word.

An input of bit modeler 406 is configured to receive an output word from image data memory 404. Another input of bit modeler 406 receives significance flags from a significance flags memory 416, which may be RAM. Entropy encoder 400 performs a plurality of coding operations ("coding passes") on each bit-plane. In an embodiment, bit modeler 406 models each bit-plane in accordance with three well-known coding passes set forth in the JPEG2000 standard, namely, the significance pass, the magnitude refinement pass, and the cleanup pass. Each bit within a bit-plane is processed during one of the coding passes to produce modeled data. An exemplary bit-plane coding process is described in "Embedded Block Coding in JPEG2000", David Taubman et al., IEEE International Conference on Image Processing (ICIP), Vol. 2, pp. 33-36, September 2000, which is incorporated by reference herein in its entirety.

Bit modeler 406 advantageously processes a plurality of bit-planes in parallel. In an embodiment, bit modeler 406 processes M bit-planes in parallel, where M is greater than 1 but no greater than the total number of bit-planes of the image data. By processing a plurality of bit-planes in parallel, entropy coder 400 exhibits increased performance, as compared to conventional entropy coders that process a single bit-plane at a time.

In addition, entropy coder 400 performs coding passes in parallel for each bit-plane processed. In an embodiment, bit modeler 406 models each stripe of a given bit-plane by performing the three coding passes in parallel. For each stripe that is processed, bit-modeler 406 produces a plurality of modeled data ("decision/context (D/CX) pairs"). As understood by those skilled in the art, a decision bit is a binary valued symbol and a context includes information corresponding to the significance and sign of a bit and its neighbors.

Bit modeler 406 includes M output terminals $407_1$ through $407_M$ (collectively referred to as output terminals 407), where each of output terminals 407 is configured to provide a plurality of D/CX pairs for each stripe. In an embodiment, each of output terminals 407 is configured to provide at most six D/CX pairs for each stripe in a 36-bit word. Notably, the 36-bit word may store six decision bits, six 4-bit context words, as well as the required op-codes and flags that are used by arithmetic coder circuitry 410 to properly interpret the data. An exemplary embodiment of bit-modeler 406 is described below with respect to FIG. 6.

Each of the output terminals 407 is coupled to FIFO memory 408. FIFO memory 408 includes M output terminals $409_1$ through $409_M$ (collectively referred to as output terminals 409). Each of the output terminals 409 is configured to provide D/CX pairs to arithmetic coder circuitry 410. Another input of arithmetic coder circuitry 410 is configured to receive index/most probably symbol (MPS) information from a table stored in memory 418. Yet another input of arithmetic coder circuitry 410 is configured to receive probability/next state information from a table stored in memory 420. Memory 418 may be RAM, and memory 420 may be read-only memory (ROM).

Arithmetic coder circuitry 410 employs context-based, adaptive binary arithmetic coding, known as "MQ" coding. Notably, arithmetic coder circuitry 410 codes the decision bits within the D/CX pairs using the associated context value. A separate probability is maintained in memory 418 for each of the possible context values. Each probability is updated adaptively each time a new decision bit is coded. An exemplary arithmetic coding process is described in Taubman et al. cited above.

In accordance with one or more aspects of the invention, arithmetic coder circuitry 410 processes multiple D/CX pairs for multiple bit-planes in parallel. Since the D/CX pairs of a given input word were modeled from a single stripe, the input word may include multiple D/CX pairs corresponding to a single coding pass ("intra-pass parallel"), as well as multiple D/CX pairs amongst all three coding passes ("inter-pass parallel"). By providing multiple D/CX pairs to arithmetic coder circuitry 410, an embodiment of the invention advantageously reduces or eliminates stall states in both arithmetic coder circuitry 410 and bit modeler circuitry 406.

Arithmetic coder circuitry 410 includes M output terminals $411_1$ through $411_M$ (collectively referred to as output terminals 411). Each of output terminals 411 provides a coded bytestream corresponding to FIFO memory 412. An output of FIFO memory 412 provides the entropy coded bytestream. Control circuitry 414 receives data from sign-magnitude converter/stripe creator 402, bit modeler 406, FIFO memory 408, and arithmetic coder circuitry 410. Control circuitry 414 provides rate control information to bit modeler 406 and arithmetic coder circuitry 410 and controls the rate of coding of entropy coder 400.

Figure 6:
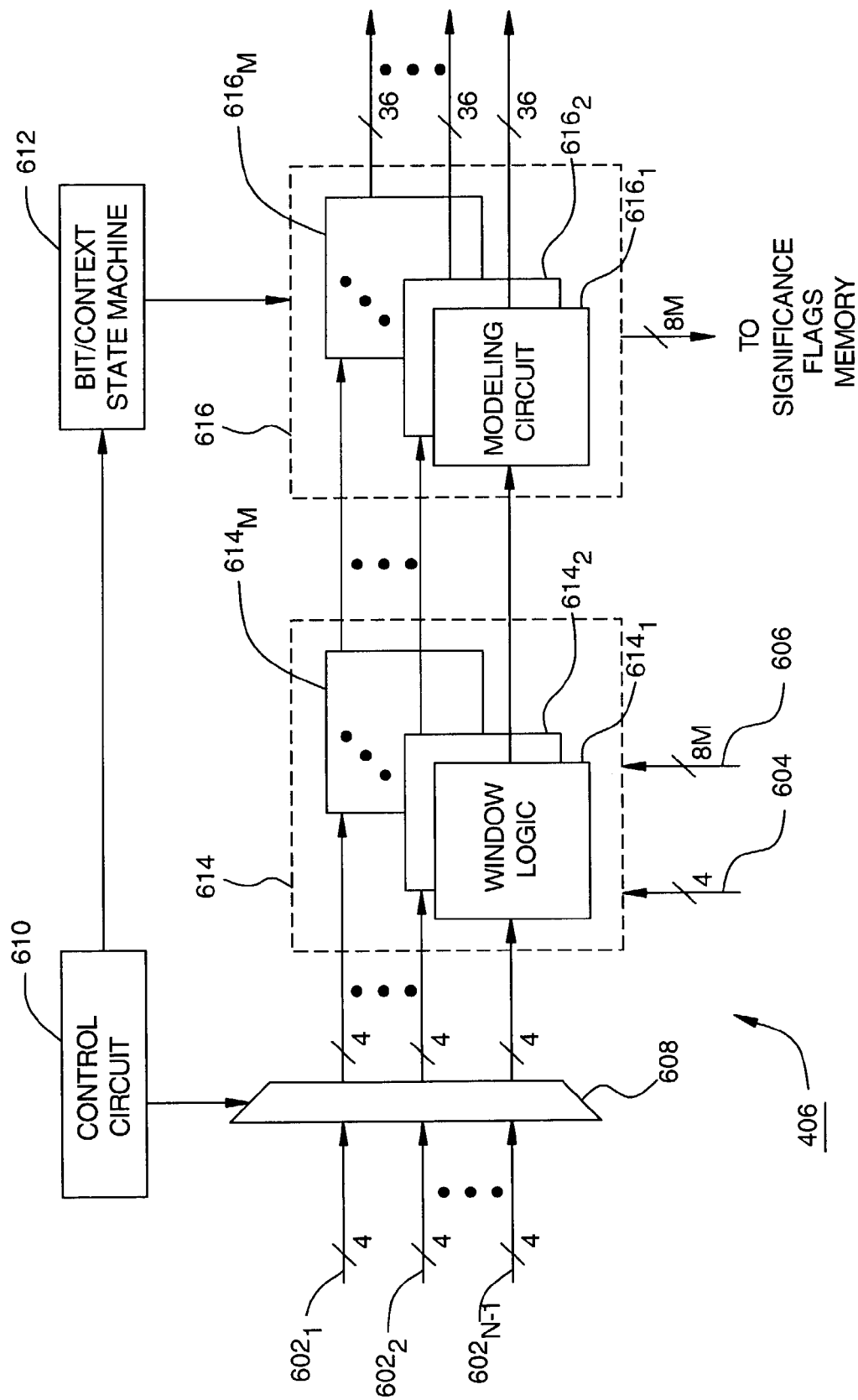
FIG. 6 depicts a block diagram showing an exemplary bit modeler in accordance with one or more aspects of the invention.

FIG. 6 depicts a block diagram showing an exemplary bit modeler 406 in accordance with one or more aspects of the invention. Bit modeler 406 includes a multiplexer 608, a control circuit 610, a bit/context state machine 612, window logic circuits $614_1$ through $614_M$ (collectively referred to as window logic circuits 614), and modeling circuits $616_1$ through $616_M$ (collectively referred to as modeling circuits 616), where M is the number of bit-planes to be processed in parallel. Bit modeler 406 further includes N−1 input terminals $602_1$ through $602_{N-1}$ (collectively referred to as input terminals 602), where N is the number of bit-planes in the image data, an input terminal 604, and an input terminal 606.

Each of input terminals 602 is configured to receive a single stripe of a respective one of the magnitude bit-planes. Input terminal 604 is configured to receive a single stripe of the sign bit-plane. In the embodiment where each stripe includes 4 bits, each of input terminals 602, as well as input terminal 604, is configured to receive a 4-bit word. Input terminal 606 is configured to receive significance flag(s) information. In an embodiment, significance flag(s) information for a stripe is contained within an 8-bit value (e.g., a 2-bit flag for each data bit). Since bit-modeler 406 processes M bit-planes in parallel, input terminal 606 is configured to provide an 8M-bit word. Significance flag(s) information is used by window logic circuits 614 to determine a context for each bit of the respective bit-planes.

N input terminals of multiplexer 608 are respectively coupled to input terminals $602_1$ through $602_N$. M output terminals of multiplexer 608 are respectively coupled to input terminals of window logic circuits $614_1$ through $614_M$. A control terminal of multiplexer 608 is coupled to an output terminal of control circuit 610. Control circuit 610 controls multiplexer 608 such that the N input terminals $602_1$ through $602_{N-1}$ are multiplexed amongst the M output terminals of multiplexer 608. Control circuit 610 selects specific ones of input terminals 602 using information from bit/context state machine 612, which indicates which of the N−1 magnitude bit-planes are to be processed. Bit/context state machine 612 controls the coding passes performed on the M bit-planes and interfaces with control circuitry 414 to assure that all required bit-planes are processed.

Additional input terminals of window logic circuits 614 are respectively coupled to input terminal 604 and input terminal 606. An output terminal of each of window logic circuits $614_1$ through $614_M$ is respectively coupled to an input terminal of each of modeling circuits $616_1$ through $616_M$. Additional input terminals of modeling circuits 616 are coupled to bit/context state machine 612. An output of each of modeling circuits 616 provides a 36-bit word having a plurality of D/CX pairs. An additional output of each of modeling circuits 616 provides information for updating significance flags memory 416.

In operation, bit modeler 406 processes M bit-planes in parallel using window logic circuits 614 and modeling circuits 616. Each of modeling circuits 616 performs three coding passes on a respective bit-plane in parallel. Notably, for each coding pass, each of modeling circuits 616 performs one of four coding primitives according to context information provided by a respective one of window logic circuits 614. The production of context information using window logic and the modeling of bits based on the context information are described in "Efficient Pass-Parallel Architecture for EBCOT in JPEG2000", by Jen-Shiun Chiang et al., IEEE ISCAS 2002, Vol. 1, pp. 773-776, May 2002, which is incorporated by reference herein in its entirety. In contrast with prior techniques, however, bit modeler 406 provides multiple D/CX pairs for each stripe such that the multiple D/CX pairs can be processed in parallel by arithmetic coder circuitry 410.

Notably, a first significance flag, $\sigma_0[k]$, is used to signify the significance of coefficient k in the first coding pass (i.e., the significance propagation pass). A second significance flag, $\sigma_1[k]$, is used to signify the significance of coefficient k in the third coding pass (i.e., the cleanup pass). A refinement state variable, $\gamma[k]$, is introduced to determine whether coding in the second coding pass (i.e., magnitude refinement pass) is necessary. The refinement state variable is defined as follows:

$$\gamma[k]=\sigma_0[k]+\sigma_1[k] \qquad \text{Eq. 1}$$

After a bit has been coded in the second pass, then both significance flags are set to a logic value of '1'. The significance used for the context generation depends upon the particular coding pass and upon whether or not the particular stripe has been visited/processed. Table 1 lists the significance for the three coding passes, where $v_p[k]$ is the magnitude bit and $CX_p[k]$ is the context value of coefficient k at bit-plane position p.

TABLE 1

Significance values used for context generation

| Coding Pass | Visited Samples | Not Yet Visited Samples |
|---|---|---|
| Pass 1: Significance propagation | $\sigma_0[k]$ | $\sigma_0[k] + \sigma_1[k]$ |
| Pass 2: Magnitude Refinement | $\sigma_0[k]$ | $\sigma_0[k] + \sigma_1[k] + v_p[k]$ |
| Pass 3: Cleanup | $\sigma_0[k] + \sigma_1[k]$ | $\sigma_0[k] + \sigma_1[k] + (v_p[k] \cdot (CX_p[k] \neq 0))$ |

Thus, an embodiment of the invention performs bit/context modeling on all bits, for all necessary coding passes, for all stripes, for all bit-planes (where M bit-planes are processed in parallel), for all code-blocks of the input image data. That is, the following nested loops are performed by this embodiment of the invention:

```
For all code-blocks
    For all bit-planes (M processed in parallel)
        For all stripes
            For all coding passes (as needed)
                Perform bit/context modeling on all bits
```

Notably, during the nested processing of this embodiment of the invention, not all of the three coding passes are required to be performed on each stripe that is processed. In particular, if all the bits in a given stripe are coded in the significance propagation pass (i.e., the first coding pass), then the second and third coding passes may be skipped.

Figure 7:
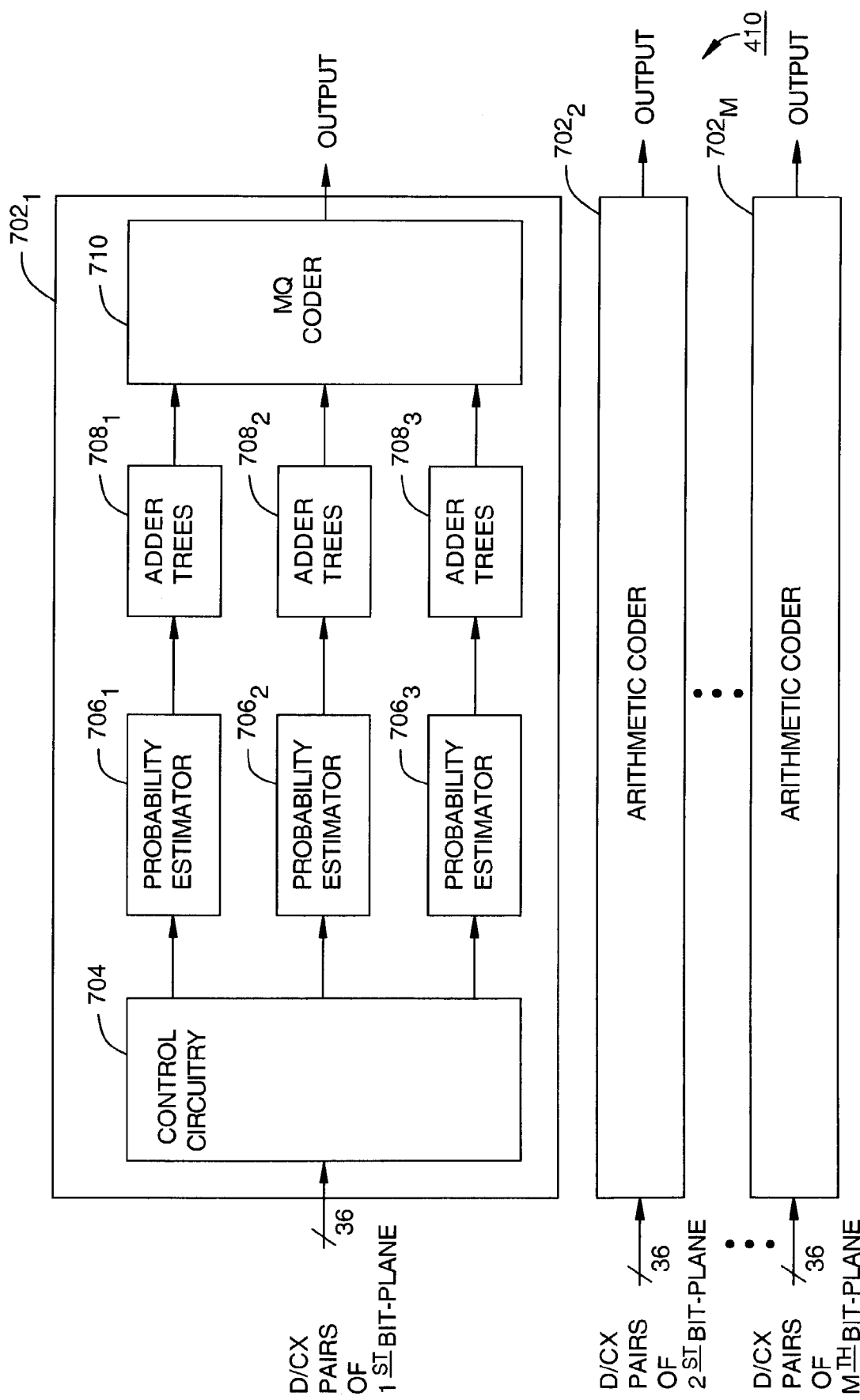
FIG. 7 depicts a block diagram showing an exemplary embodiment of arithmetic coder circuitry in accordance with one or more aspects of the invention.

FIG. 7 depicts a block diagram showing an exemplary embodiment of arithmetic coder circuitry 410 in accordance with one or more aspects of the invention. Arithmetic coder circuitry 410 includes M arithmetic coders $702_1$ through $702_M$ (collectively referred to as arithmetic coders 702), where M is the number of bit-planes processed in parallel by bit modeler 406. For purposes of clarity, only one arithmetic coder $702_1$ is shown in detail. It is to be understood, however, that each of the arithmetic coders 702 include the components shown in arithmetic coder $702_1$.

Arithmetic coder $702_1$ includes control circuitry 704, probability estimators $706_1$ through $706_3$ (collectively referred to as probability estimators 706), adder trees $708_1$ through $708_3$ (collectively referred to as adder trees 708), and an MQ coder 710. An input of control circuitry 704 is configured to receive an output word from FIFO memory 408 having a plurality of D/CX pairs. As described above, in an embodiment, each output word of FIFO memory 408 provides up to six D/CX pairs. For a given output word of FIFO memory 408, the D/CX pairs were modeled from a single stripe and, as such, there may be multiple D/CX pairs corresponding to a single coding pass, as well as multiple D/CX pairs respectively corresponding to multiple coding passes.

Each of probability estimators 706 respectively corresponds to one of the three coding passes performed by bit modeler 406. By employing three separate probability estimators 706, an embodiment of the invention operates on multiple D/CX pairs from some or all of the three coding passes (i.e., inter-pass parallel). In addition, an input terminal of each of probability estimators 706 may receive multiple DC/X pairs from a single coding pass (i.e., intra-pass parallel).

For example, a given output word from FIFO memory 408 may include six D/CX pairs. Three of the six D/CX pairs may correspond to the first code pass, two of the six D/CX pairs may correspond to the second code pass, and one of the six D/CX pairs may correspond to the third code pass. Control circuitry 704 provides the three D/CX pairs corresponding to the first code pass to probability estimator $706_1$, the two D/CX pairs corresponding to the second code pass to probability estimator $706_2$, and the one D/CX pair corresponding to the third code pass to probability estimator $706_3$. As such, probability estimator $706_1$ processes three intra-pass D/CX pairs in parallel. In addition, probability estimators 706 process inter-pass D/CX pairs.

Each of the probability estimators 706 performs probability estimation using context values from D/CX pairs in a well-known manner. An output terminal of each of probability estimators 706 is coupled to a respective one of adder trees 708. Each of probability estimators 706 provides probability estimates corresponding to the number of D/CX pairs processed. For example, if probability estimator 706₁ processes three D/CX pairs as described in the example above, then three probability estimates are provided to adder tree 708₁. In a well-known manner in accordance with the JPEG2000 standard, the probability estimates are used for simple arithmetic operations with register values from MQ coder 710. As long as a renormalization is not required as described in the JPEG2000 standard, then multiple probability estimates may be processed simultaneously. When a renormalization is required, a partial barrel shifter may be added to MQ coder 710 such that multiple bit-shifts can occur simultaneously. If up to 2 bit-shifts are performed simultaneously, then a 9% improvement was found over a 1-bit shift circuit.

Figure 8:
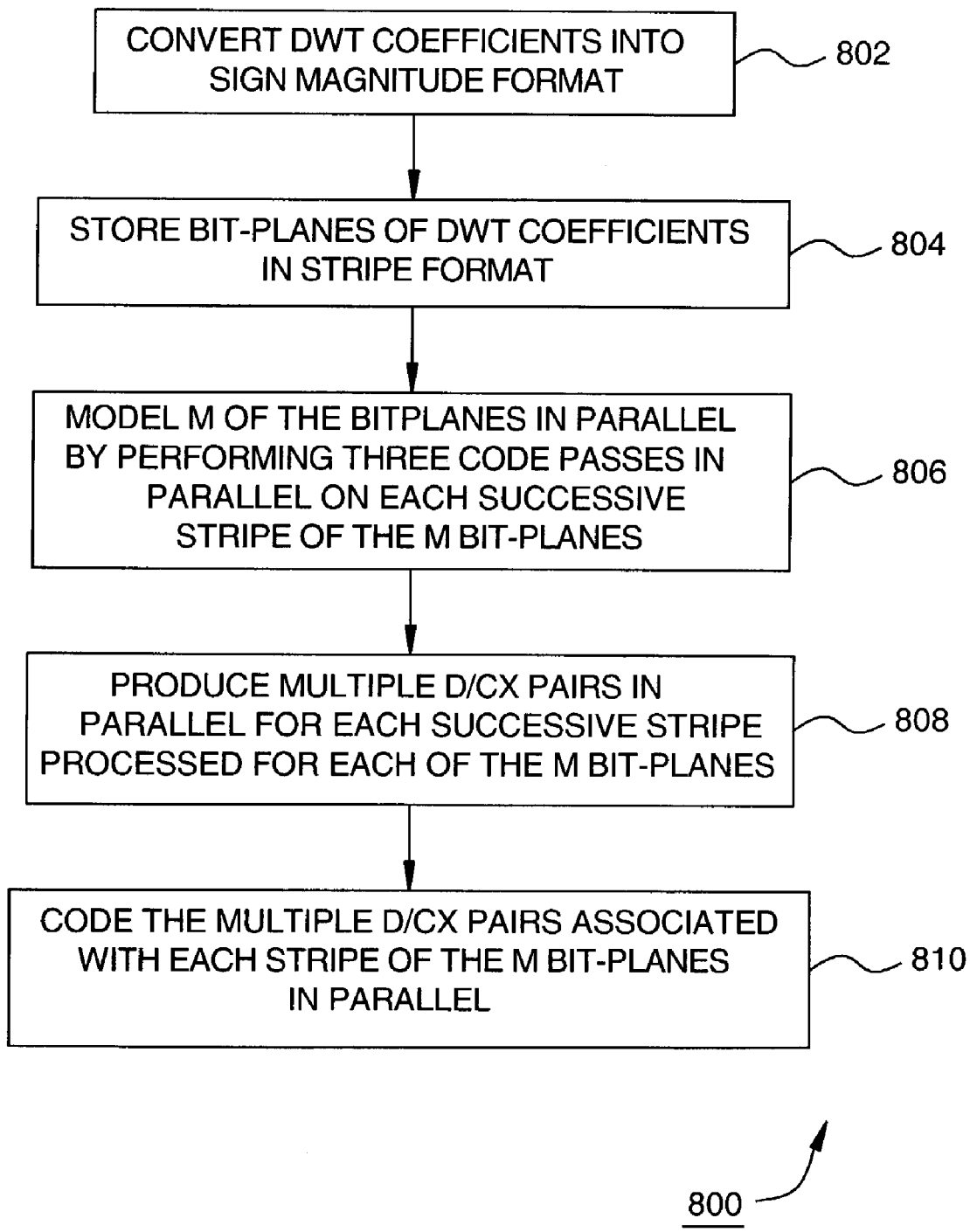
FIG. 8 depicts a flow diagram showing an exemplary embodiment of a process for entropy coding an image in accordance with one or more aspects of the invention.

FIG. 8 depicts a flow diagram showing an exemplary embodiment of a process 800 for entropy coding an image in accordance with one or more aspects of the invention. Process 800 begins at step 802, where DWT coefficients of a given code-block are converted into sign-magnitude format. At step 804, the bit-planes of the DWT coefficients converted in step 802 are stored in stripe format. For example, each of the bit-planes may be partitioned into multiple stripes, where each of the stripes includes four bits.

At step 806, M of the bit-planes stored in step 804 are modeled in parallel by performing three code passes in parallel on each stripe of the M bit-planes, where M is greater than 1 and no greater than the total number of bit-planes. At step 808, multiple D/CX pairs for each stripe processed for each of the M bit-planes are produced. For example, up to six D/CX pairs may be produced for each stripe processed. At step 810, the multiple D/CX pairs associated with each stripe of each bit-plane are coded in parallel.

Figure 9:
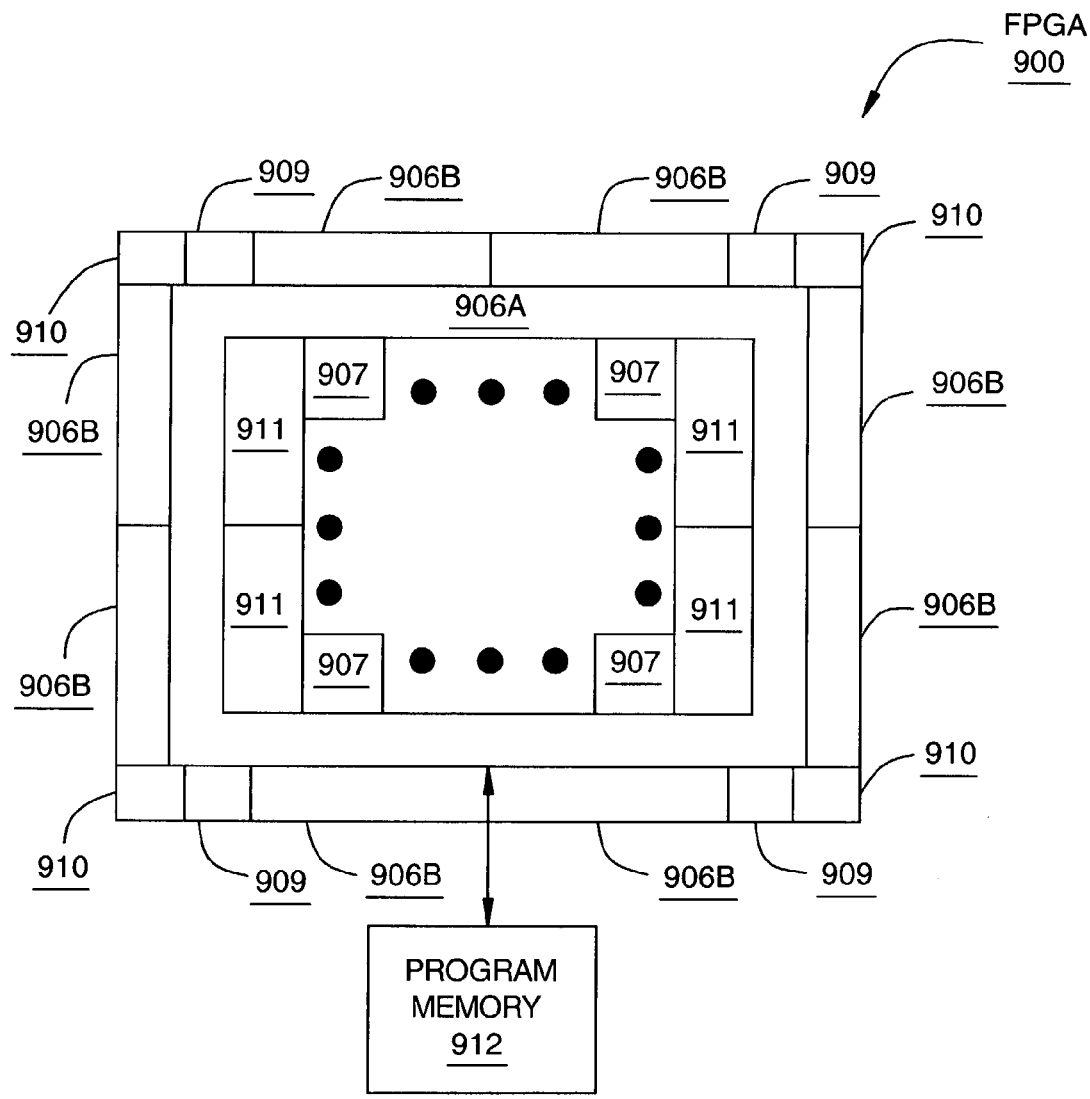
FIG. 9 depicts a block diagram of an exemplary embodiment of a field programmable gate array (FPGA) in accordance of one or more aspects of the invention coupled to a program memory.

FIG. 9 depicts a block diagram of an exemplary embodiment of a field programmable gate array (FPGA) 900 in accordance of one or more aspects of the invention coupled to a program memory 912. FPGA 900 illustratively includes CLBs 907, I/O routing ring 906A ("programmable interconnect"), memory 911, such as random access memory, delay lock loop (DLL) blocks 909, multiply/divide/de-skew clock circuits 910, and programmable IOBs 906B. DLL blocks 909 and clock circuits 910 collectively provide well-known digital clock management (DCM) circuits for managing clock signals within FPGA 900. Those skilled in the art understand that FPGA 900 may include other types of logic blocks and circuits in addition to those described herein.

As is well known in the art, CLBs 904 are programmably connectable to each other, and to I/O routing ring 908, for performing various types of logic functions. Each of CLBs 904 may include one or more "slices" and programmable interconnect circuitry (not shown). Each CLB slice in turn includes various circuits, such as flip-flops, function generators (e.g., a look-up tables (LUTs)), logic gates, memory, and like type well-known circuits.

Programmable IOBs 906B are configured to provide input to, and receive output from, one or more of CLBs 907. Configuration information for CLBs 907, I/O routing ring 906A, and programmable IOBs 906B is stored in memory 911. Briefly stated, a configuration bitstream produced from program memory 912 is coupled to a configuration port of FPGA 900 to implement a desired circuit therein. The configuration process of FPGA 900 is also well known in the art. CLBs 907, I/O routing ring 906A, and programmable IOBs 906B are collectively referred to herein as "FPGA fabric".

In an embodiment, entropy encoder 400 may be implemented within FPGA 900. Notably, sign-magnitude converter/stripe creator 402, bit modeler 406, control circuitry 414, and arithmetic coder circuitry 410 may be implemented using the FPGA fabric of FPGA 900. Image data memory 404, significance flags memory 416, and memory 418 may be implemented using RAM within FPGA 900, such as block ram (BRAM). In an embodiment, multiple entropy encoders 400 may be implemented within FPGA 900 for processing multiple code-blocks in parallel. Since entropy encoder 400 employs an efficient parallel implementation, more hardware resources are available to instantiate multiple entropy encoders 400. Such a technique may be used for high-rate applications, such as digital cinema, where a single entropy encoder is not capable of sustaining the required data rate. In addition, by implementing entropy encoder 400 within FPGA 900, the design may be re-programmed to support a range of frame rates as desired.

Method and apparatus for efficient entropy coding of an image has been described. The bit-planes of the image data are efficiently portioned into stripes and stored in an organized format to facilitate bit modeling. A bit-plane of the image data is modeled using a plurality of code passes in parallel. In addition, a plurality of the bit-planes may be modeled in parallel. An embodiment of the invention supplies multiple D/CX pairs produced by the bit modeler to an arithmetic coder, which operates on multiple D/CX pairs for a single code pass in parallel, as well as multiple D/CX pairs amongst multiple code passes in parallel. This embodiment of invention is capable of encoding an image approximately 50% faster than conventional entropy encoders, even if bit-plane parallelism is not employed. As such, this embodiment of invention allows for increase data throughput rates when compared to conventional entropy encoders.

While the foregoing describes exemplary embodiment(s) in accordance with one or more aspects of the invention, other and further embodiment(s) in accordance with the one or more aspects of the invention may be devised without departing from the scope thereof, which is determined by the claim(s) that follow and equivalents thereof. Claim(s) listing steps do not imply any order of the steps. Trademarks are the property of their respective owners.

The invention claimed is:

1. An apparatus for encoding image data, comprising:
  discrete-wavelet transform ("DWT") coefficient words converted into sign-magnitude format to provide bit-planes organized as predefined data units, the data units being multi-bit words wherein each of the multi-bit words holds a respective multi-bit stripe for each bit-plane of the bit-planes;
  a memory configured to store the bit-planes associated with the image data, the memory configured to store the bit-planes as multi-bit stripes, the multi-bit stripes being for each of the bit-planes;
  a bit modeler coupled with the memory, the bit modeler configured to produce modeled data in response to each of the data units for each of the bit-planes;
  the bit modeler configured to process the bit-planes of the data units in parallel to produce the modeled data;
  the bit modeler configured to model each of the multi-bit stripes of each of the bit-planes in a plurality of coding operations performed in parallel on each of the data units processed;
  the modeled data being decision/context pairs;
  the bit modeler having a plurality of output terminals, wherein each of the output terminals is configured to provide a plurality of the decision/context pairs for each of multi-bit stripes;

the bit modeler having a multiplexer circuitry, window logic circuits, and modeling circuits;

the multiplexer circuitry having input terminals respectively associated with the bit-planes and output terminals respectively associated with at least two of the bit-planes;

the multiplexer circuitry configured to multiplex stripes of a magnitude portion of the bit-planes to output selected stripes;

the window logic circuits respectively coupled to the output terminals of the multiplexer circuitry;

the window logic circuits configured to window the selected stripes responsive to a sign portion of the bit-planes and significance flags respectively associated with the selected stripes to provide the bit planes with context information;

the modeling circuits respectively coupled to the window logic circuits;

the modeling circuits capable of performing three coding passes in parallel on each of the bit planes wherein each pass thereof includes performing one of four coding primitives responsive to the context information to generate the plurality of the decision/context pairs;

an arithmetic coder coupled to receive the plurality of the decision/context pairs from the bit modeler, the arithmetic coder configured to produce coded data in response to the modeled data produced; and the arithmetic coder configured to process the plurality of the decision/context pairs for the bit-planes associated therewith in parallel.

2. The apparatus of claim 1, wherein the bit modeler is configured to process each of the multi-bit stripes in a scan order; wherein horizontal rows within the bit-plane are scanned from top to bottom; wherein the multi-bit stripes within a horizontal row of the horizontal rows are scanned from left to right; and wherein bits within the multi-bit stripes are scanned from top to bottom.

3. The apparatus of claim 1, wherein the arithmetic coder comprises: probability estimators respectively associated with the coding operations; and a coder in communication with the probability estimators.

4. The apparatus of claim 1, further comprising a sign-magnitude converter to convert the image data into the sign-magnitude format, wherein the DWT coefficients are converted to provide each of the bit-planes as a sign bit-plane and a plurality of magnitude bit-planes.

5. The apparatus of claim 4, wherein the plurality of coding operations includes a significance coding operation, a magnitude refinement coding operation, and a cleanup coding operation.

6. The apparatus of claim 4, further comprising:

a plurality of programmable logic blocks configured to implement an entropy encoder including the apparatus.

7. An apparatus for encoding image data, comprising:

means for storing bit-planes associated with the image data, the memory configured to store the bit-planes as multi-bit stripes, wherein discrete-wavelet transform ("DWT") coefficient words converted into sign-magnitude format provide the bit-planes organized as predefined data units, the data units being multi-bit words wherein each of the multi-bit words holds respective a multi-bit stripe for each of the bit-planes;

the multi-bit stripes being for each of the bit-planes;

means for producing modeled data in response to each of the data units for each of the bit-planes;

the means for producing modeled data configured to process the bit-planes of the data units in parallel to produce the modeled data;

the means for producing modeled data configured to model each of the multi-bit stripes of each the bit-planes in a plurality of coding operations performed in parallel on each of the data units processed;

the modeled data being decision/context pairs;

the means for producing modeled data having a plurality of output terminals, wherein each output terminal of the output terminals is configured to provide a plurality of the decision/context pairs for each of the multi-bit stripes;

the means for producing modeled data further having a multiplexer circuitry, window logic circuits, and modeling circuits;

the multiplexer circuitry having input terminals respectively associated with the bit-planes and output terminals respectively associated with at least two of the bit-planes;

the multiplexer circuitry configured to multiplex stripes of a magnitude portion of the bit-planes to output selected stripes;

the window logic circuits respectively coupled to the output terminals of the multiplexer circuitry;

the window logic circuits configured to window the selected stripes responsive to a sign portion of the bit-planes and significance flags respectively associated with the selected stripes to provide the bit planes with context information;

the modeling circuits respectively coupled to the window logic circuits;

the modeling circuits capable of performing three coding passes in parallel on each of the bit planes wherein each pass thereof includes performing one of four coding primitives responsive to the context information to generate the plurality of the decision/context pairs; and means for producing coded data in response to each of the modeled data produced.

8. A method of encoding image data, comprising:

converting discrete-wavelet transform ("DWT") coefficient words into sign-magnitude format to provide a plurality of bit-planes organized as predefined data units, the data units being multi-bit words wherein each of the multi-bit words holds a respective multi-bit stripe for each of the plurality of bit-planes;

storing the plurality of bit-planes as associated with the image data as multi-bit stripes, the multi-bit stripes being associated with the plurality of bit-planes;

producing a plurality of modeled data in response to each data unit of the plurality of data units for each of the plurality of bit-planes, wherein the plurality of bit-planes are processed in parallel to produce the plurality of modeled data, the plurality of modeled data being decision/context pairs;

the producing including:

modeling each of the multi-bit stripes of each of the bit-planes in a plurality of coding operations performed in parallel on each of the data units processed;

wherein the modeling includes:

multiplexing stripes of a magnitude portion of the plurality of bit-planes to output selected stripes;

windowing the selected stripes responsive to a sign stripe portion of the plurality of bit-planes and significance flags to provide the bit-planes with context information;

performing three coding passes in parallel on each of the bit-planes wherein each pass of the coding passes includes performing one of four coding primitives responsive to the context information; and outputting the plurality of modeled data as a plurality of the decision/context pairs for each of the multi-bit stripes for each of a plurality of output terminals for arithmetic coding; and producing a plurality of coded data in response to the arithmetic coding of the plurality of modeled data produced.

* * * * *